United States Patent [19]

Cuthbert et al.

[11] 4,050,821
[45] Sept. 27, 1977

[54] LINEWIDTH MEASUREMENT METHOD AND APPARATUS

[75] Inventors: John David Cuthbert, Bethlehem; David Farnham Munro, Alburtis, both of Pa.

[73] Assignee: Bell Telephone Laboratories, Incorporated, Murray Hill, N.J.

[21] Appl. No.: 726,603

[22] Filed: Sept. 27, 1976

[51] Int. Cl.² .................. G01B 11/02; G01B 11/28; G01N 21/22
[52] U.S. Cl. ..................... 356/156; 356/157; 356/204
[58] Field of Search .................. 356/156–160, 356/204–206; 250/560; 118/9; 156/627; 204/129.2, 129.3; 427/10

[56] References Cited

U.S. PATENT DOCUMENTS

| | | | |
|---|---|---|---|
| 2,939,361 | 6/1960 | Hock | 356/206 |
| 3,645,811 | 2/1972 | Davis et al. | 156/5 |
| 3,669,771 | 6/1972 | Lerner et al. | 156/8 |
| 3,740,152 | 6/1973 | Iisuka | 356/156 |

OTHER PUBLICATIONS

Bojman, W., "Detection and/or Measurement on Complex Patterns", IBM Tech. Disc. Bull., vol. 13, 11–1970, pp. 1429–1430.

*Primary Examiner*—Paul A. Sacher
*Assistant Examiner*—Wm. H. Punter
*Attorney, Agent, or Firm*—Lucian C. Canepa

[57] ABSTRACT

Very rapid and accurate linewidth measurements in selected subregions of an LSI mask or wafer are made by means of a low-cost apparatus. The apparatus embodies the recognition that an accurate linewidth determination can be made for any particular feature among a variety of features in a repeated array by a calibrated and normalized measurement of the average light transmission or reflection of a subregion that includes the feature. In turn, the measurement is automatically converted to a linewidth reading by analog computing circuitry.

6 Claims, 4 Drawing Figures

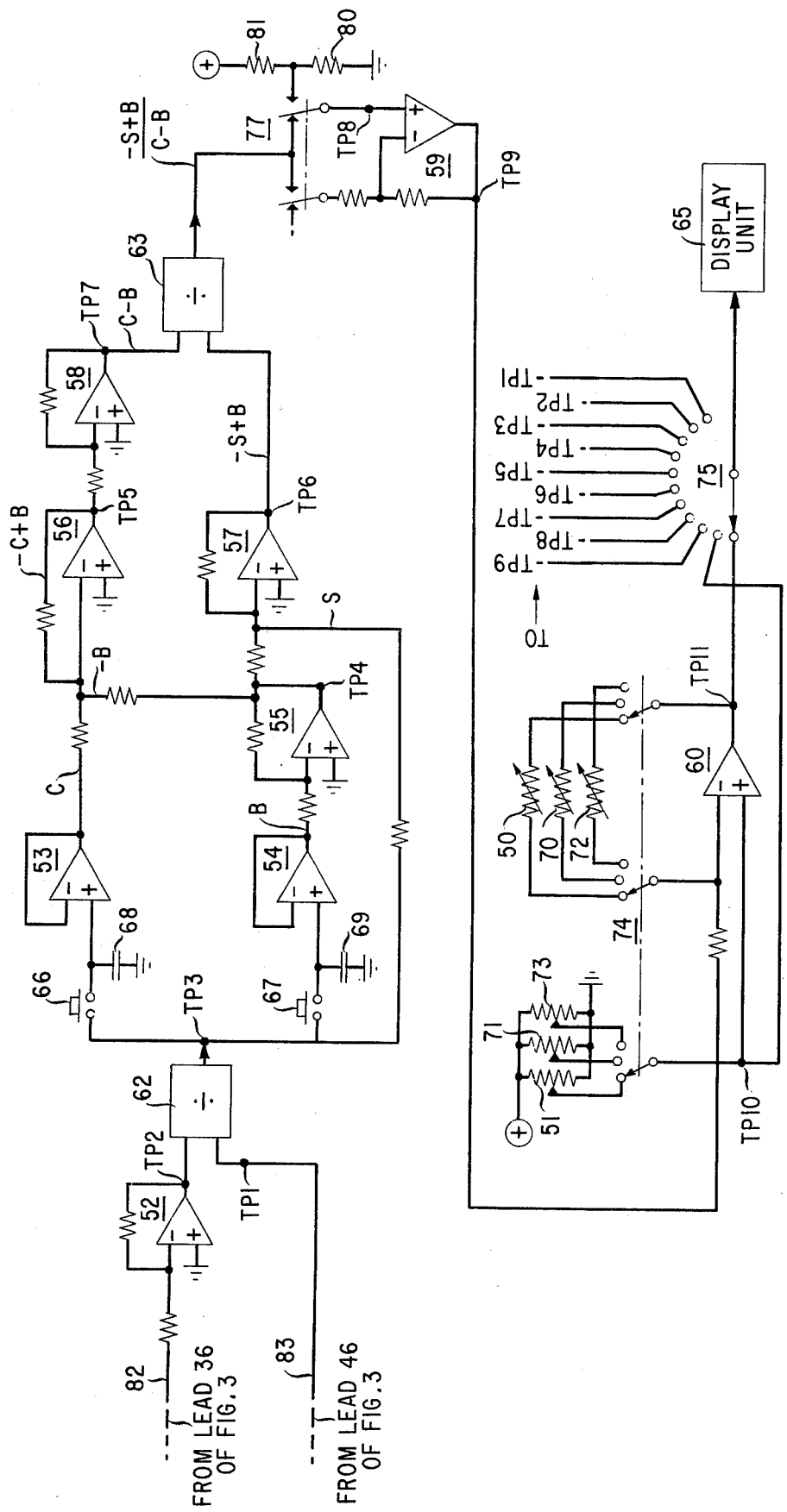

LINEWIDTH MEASUREMENT METHOD AND APPARATUS

BACKGROUND OF THE INVENTION

This invention relates to a technique utilized in the fabrication of microminiature devices and, more particularly, to a method and apparatus for measuring the widths of features on masks and wafers employed in making large-scale-integrated (LSI) devices.

It is well recognized that highly accurate control of the size of features formed on masks and wafers is critical in the overall process of manufacturing reliable LSI devices. Thus, for example, before using a set of masks to form features on an associated wafer, it is important that each of the masks be checked to determine whether or not specified linewidths thereon have been made within prescribed tolerances. And, subsequently in the process, it may be important to check the widths of features actually formed on the wafer.

A number of techniques are known in the art for measuring linewidths. Each such technique has its own unique set of characteristics which make it suitable or not for a particular application. Thus, for example, the conventional technique known as image shearing is characterized by medium cost and general utility. But image shearing is relatively slow and exhibits only fair reproducibility because it requires that an operator make judgments as to when cross hairs or split images are exactly aligned.

In making LSI devices by contact or near-contact lithographic processes, mask degradation is a common problem. Accordingly, plural replicas of each mask of the set of masks required for a particular device must typically be available. As a result, the number of masks utilized to fabricate some devices of practical interest becomes relatively large. With known techniques, the monitoring of such a large number of masks to assess whether or not their linewidths are satisfactory is a time consuming and expensive operation.

Accordingly, the need arose for a linewidth measurement technique that would be fast, accurate and relatively low cost. It was recognized that such a technique, if available, would facilitate the fabrication of reliable LSI devices.

SUMMARY OF THE INVENTION

An object of the present invention is a low-cost linewidth measurement technique that is fast and accurate.

Briefly, this and other objects of the present invention are realized in a specific illustrative embodiment thereof in which very rapid and accurate linewidth measurements are made in selected subregions of an LSI mask or wafer. In accordance with the invention, the procedure to be followed includes making a calibrated and normalized measurement of the average light transmission or reflection in a specified subregion. This subregion includes a feature whose linewidth is to be determined. In turn, this measurement is automatically converted to a linewidth reading by analog computing circuitry.

BRIEF DESCRIPTION OF THE DRAWING

A complete understanding of the present invention and of the above and other objects, features and advantages thereof may be gained from a consideration of the following detailed description presented hereinbelow in connection with the accompanying drawing, in which:

FIG. 4 shows specific illustrative circuitry for converting the signals provided by the FIG. 3 apparatus to a linewidth reading.

DETAILED DESCRIPTION

For purposes of a specific illustrative example, the detailed description below will be directed primarily to a method and an apparatus for measuring the widths of features on a mask element. But, as will be emphasized again later toward the end of this description, the principles of the present invention are also applicable to the measurement of wafer features.

A variety of small-feature-size masks are utilized to fabricate microminiature devices. One typical such mask comprises a planar glass member having an opaque coating such as chrome deposited thereon. In conventional ways the opaque coating is selectively patterned to form multiple regions of chip areas each having opaque and transparent portions. Illustratively, the regions are patterned to be identical replicas of each other. In each region, clear or transparent features may be formed in a dark or opaque background or vice versa, depending on the specific process to be used for delineating the pattern in the final device to be fabricated by means of the mask.

Figure 1:
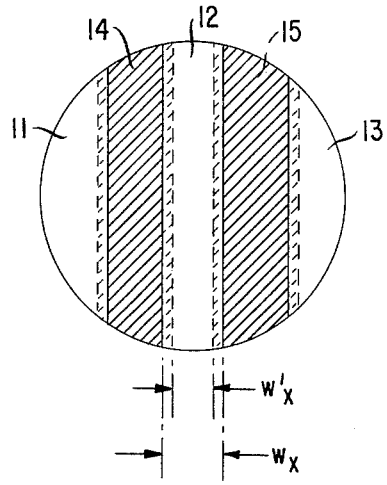
FIG. 1 shows an illustrative mask subregion having a feature whose linewidth is to be measured.

In FIG. 1 a portion or subregion of a particular mask region is depicted. The pattern shown therein is a simplified illustrative version of what would be seen by an operator in a subregion using a microscope 10 of the type represented in FIG. 3.

By way of a specific example, the circular field of view depicted in FIG. 1 is assumed to be about 1 millimeter in diameter. The mask subregion included in this field comprises clear portions or lines 11 through 13 and opaque portions or lines 14 and 15.

Assume that it is desired to measure the actual width of the clear line 12 (FIG. 1) whose nominal width is designed to be, say, 10 micrometers. In a subregion of one mask the width of the line 12 may be determined to be $w_x$. In a different subregion of the same mask or in a subregion of a different mask, the edges of the line 12 of a FIG. 1-type pattern may have, due, for example, to processing variations, moved toward or away from each other. Accordingly, the widths of the corresponding lines may be found to be greater or less than $w_x$. As indicated in FIG. 1, the width of the line 12 may, for example, decrease to the value $w_x'$. And, moreover, in such a case, to a very good approximation, all the feature edges will be seen to have moved correspondingly by the same amount, as represented in FIG. 1 by dashed lines.

Applicants have determined that the width $w_x$ of a specified transparent line in a variety of patterns in mask subregions may be closely approximated by the expression $$w_x = k_1 T + k_2 \tag{1}$$

where $T$ is a value derived from the measured amount of light transmitted through a mask subregion (calibrated as specified below) and $k_1$ and $k_2$ are constants calculated for each different subregion configuration. Moreover, it has been determined that this approximation remains valid even when the subregion contains features of arbitrary complexity.

In those cases wherein a mask comprises opaque features on a clear background, a modified form of equation (1) is required to compute the width of an opaque line. The correct expression then is:

$$w_x = k_1(T_c - T) + k_2 \qquad (2)$$

where $T_c$ is a value derived from the actual measured amount of light transmitted through an all-clear subregion.

As a practical matter, so-called clear portions of an actual mask do not transmit 100 percent of the light directed thereat. Similarly, the dark portions of the mask are not completely opaque. Accordingly, for accurate calculations of linewidth based on transmission measurements made in accordance with the principles of the present invention, it is necessary to utilize a calibrated value for $T$ in expressions (1) and (2) above. Such a value $T$ is defined by the equation $$T = (S-B)/C-B) \qquad (3)$$

where $S$ is the value of a normalized signal derived from the actual measured amount of light transmitted through a mask subregion, $C$ is the value of a normalized signal derived from the actual measured amount of light transmitted through an all-clear subregion and $B$ is the value of a normalized signal derived from the actual measured amount of light transmitted through an all-opaque subregion.

To assure reliable linewidth measurements, it is necessary to recognize and compensate for the fact that fluctuations occur in the output of a typical source employed to direct light at a mask (or wafer) subregion. Advantageously, such compensation is achieved by directly monitoring the output level of the light source to obtain a reference signal. This reference signal is then combined with the signal obtained from the light transmitted through the mask subregion (or reflected from a wafer subregion) to provide a normalized or compensated signal. In that way, the normalized signals $S$, $B$ and $C$ in expression (3) are obtained.

Figure 2:
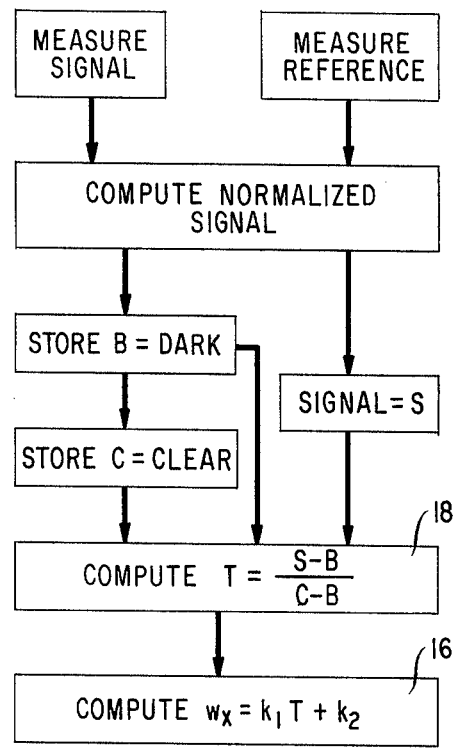
FIG. 2 is a flow diagram that represent applicants' linewidth measurement technique.

The aforedescribed linewidth measurement procedure devised by applicants is in effect summarized by the flow diagram shown in FIG. 2. Expressions (1) and (3) above are listed in boxes 16 and 18, respectively. A particular illustrative apparatus for carrying out the depicted procedure will be specified below in connection with the description of FIGS. 3 and 4.

Figure 3:
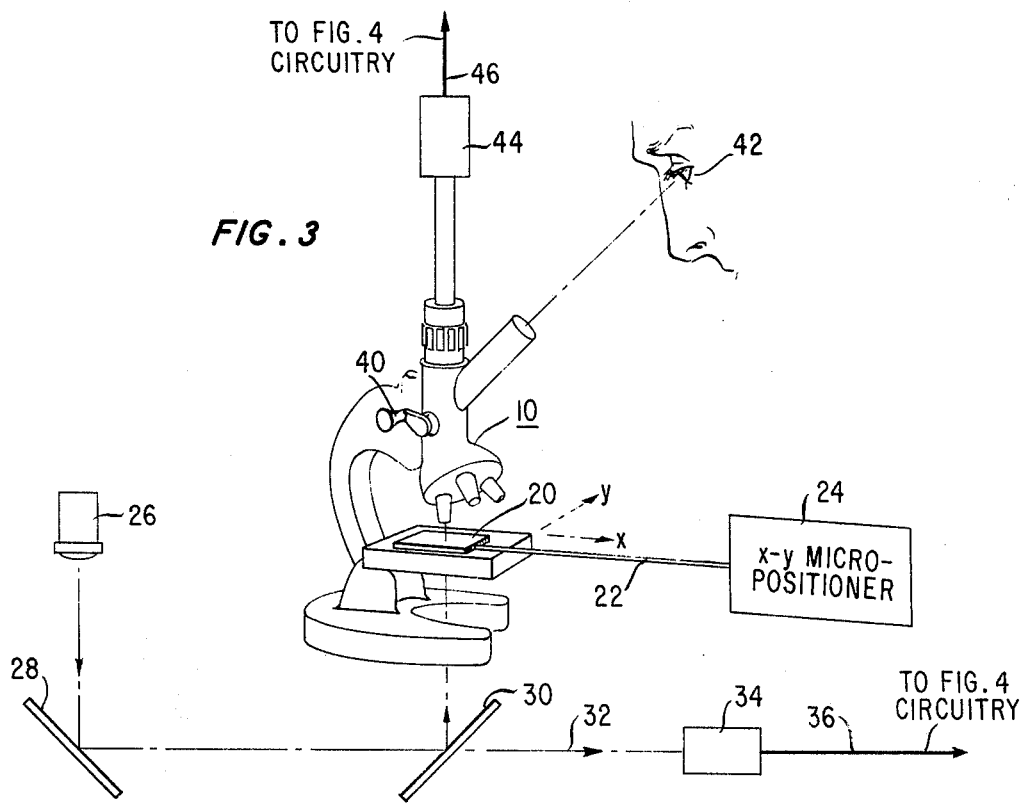
FIG. 3 depicts an illustrative apparatus made in accordance with one specific aspect of the present invention.

In FIG. 3 a mask member 20 to be tested is shown mounted in close proximity to the microscope 10. The mask is connected via a mechanical linkage 22 to a conventional x-y micropositioner 24. By means of the micropositioner 24, any specified subregion of the mask 20 may be located within the field of view of the microscope 10.

The standard microscope 10 of FIG. 3 includes a two-position control crank 40. With the crank in its so-called viewing position, an operator (represented by an eye 42) is able to see the surface of the mask 20 thereby to bring a particular subregion thereof into the field of view of the microscope. With the crank 40 in its other or detecting position, light transmitted through the mask subregion and entering the microscope is directed to a standard photodetector 44 rather than to the operator's eye.

In FIG. 3, light emanating from a source 26 is directed by a mirror 28 to a beam splitter 30. As indicated by dashed lines 32, a portion of this incident light impinges on a standard photodetector 34 whose output on lead 36 constitutes a reference electrical signal utilized for normalization purposes. This signal is applied to the circuitry shown in FIG. 4.

Another portion of the light supplied by the source 26 of FIG. 3 is directed by the beam splitter 30 through the mask subregion of interest toward the microscope 10. In turn, as indicated above, light entering the microscope 10 is directed either to an operator or to the photodetector 44, depending respectively on the position of the crank 40.

The output of the photodetector 44 of FIG. 3 is an electrical signal representative of the light transmission characteristic of a particular mask subregion. This signal, appearing on lead 46, is also applied to the circuitry shown in FIG. 4.

Signals generated by the photodetectors 34 and 44 included in the apparatus of FIG. 3 are applied to and processed by the circuitry shown in FIG. 4. That circuitry includes plural pairs of variable-resistance elements such as the pair of elements 50 and 51 whose values are initially respectively set to represent the values of the constants $k_1$ and $k_2$ in expression (1) above. Before proceeding to describe the FIG. 4 circuitry, a particular illustrative procedure for calculating the values of $k_1$ and $k_2$ will be specified. Once those values are calculated, the elements 50 and 51 can be set, in the manner described later below, to be representative of a particular subregion configuration. Similarly, each other pair of variable-resistance elements shown in FIG. 4 is initially set to be representative of the constants $k_1$ and $k_2$ for a different specified subregion geometry. Then, preceding an actual measurement, switch 74 is operated to select the pair of variable-resistance elements that corresponds to the particular subregion to be measured.

So as not to unduly clutter the drawing, only two other pairs of variable-resistance elements representative of $k_1$ and $k_2$ are shown in FIG. 4. (One pair comprises elements 70 and 71 and the other pair comprises elements 72 and 73.) Of course, plural additional such pairs may easily be provided.

The constants $k_1$ and $k_2$ may be determined either by hand calculations or by straigtforward programming of a computer to implement the procedure to be described. Assume, for example, that the total area of a particular mask subregion is measured to be 3672 square micrometers. (This measurement, which is assumed to be an "exact" one, could be done, for instance, by accurately measuring an enlarged version of the subregion and then scaling it down by an appropriate factor.) Moreover, assume that the clear or transparent area of the subregion is measured to be 1459.5 square micrometers and that the width of a selected clear line in the subregion is determined to be 9 micrometers.

Next, a change in line size for the particular subregion is assumed. For example, for one specific pattern geometry that was considered, it was assumed that the width of the selected line shrunk by 0.8 micrometers and that all other feature edges moved correspondingly. In that particular case, the total area of the clear portions of the subregion was then measured to be 1,326.6 square micrometers. The constant $k_1$ was then calculated from the expression $$k_1 = (\Delta w \, A_t)/\Delta A_c \qquad (4)$$

where $\Delta w$ is the aforespecified change (for example 0.8 micrometers) in the width of the selected line, $A_t$ is the total area (for example 3,672 square micrometers) of the mask subregion and $\Delta A_c$ is the aforespecified change (for example 131.9 square micrometers) in the area of the clear portions due to $\Delta w$ and other feature movements. For the particular values assumed above, $k_1$ was calculated to be 22.27.

The constant $k_2$ is then determined from the original equation (1). For the particular values assumed above (that is, for $w = 9$ micrometers, $k_1 = 22.27$ and $T = 1,459.5/3,672$), $k_2$ was calculated to be 0.150.

The specific illustrative circuitry shown in FIG. 4 includes nine standard operational amplifiers 52 through 60, two conventional dividers 62 and 63 and a display unit 65 such as, for example, a digital voltmeter that is calibrated to provide a direct reading of linewidth. Two momentary-contact or pushbutton switches 66 and 67 are also included in the FIG. 4 circuitry. As will be described later below, the switches 66 and 67 are utilized to place charges on capacitors 68 and 69, respectively, during a calibration interval.

The test and calibration purposes, the FIG. 4 circuitry includes, for example, eleven test points designated TP1 through TP11. By means of switch 75 any selected one of these points can be electrically connected to the display unit 65.

Another switch, designated 77 in FIG. 4, is utilized to establish the depicted circuitry in its so-called clear-feature or dark feature mode of operation. In the first-mentioned mode, widths of clear lines are measured, whereas in the other mode opaque linewidths are measured, whereas in the other mode opaque linewidths are measured. In the position shown in FIG. 4, the switch 77 is in its clear-feature position.

One specific illustrative procedure for initially adjusting the FIG. 4 circuitry is as follows. Assume that the movable arm of the switch 75 is set to make contact with TP9 and that the switch 77 is positioned as shown in the drawing. In addition, assume that an all-opaque mask subregion is placed in the field of view of the microscope 10 (FIG. 3). Under those conditions, the null offsets of the amplifiers and dividers of FIG. 4 are adjusted to achieve a reading of 0.00 on the display unit 65. Then, with an all-transparent mask subregion in the field of view of the microscope 10, the gains of the amplifiers in FIG. 4 are adjusted so that the unit 65 connected to TP9 registers a reading of, for example, $-20.00$. For these adjustments, and assuming linear circuitry, a mask subregion having a transmittivity of 50 percent would cause the unit 65 connected to TP8 to read $-10.00$.

For operation in the aforespecified dark-feature mode, the switch 77 of FIG. 4 is thrown to its left-hand position. In that case, resistors 80 and 81 are selected to cause readings at TP9 of 0.00, $-20.00$ and $-10.00$ for clear, opaque and 50-percent-transmissive subregions, respectively. Thus, in the two modes of operation of the depicted arrangement, the same range of values is obtained at TP9 but the values derived from clear and opaque subregions are respectively reversed.

To set the values of $k_1$ and $k_2$ is the FIG. 4 circuitry, the following specific illustrative procedure is followed. With the switch 75 set to monitor TP10, the arm on variable resistor 51 is moved until the unit 65 reads 0.00. Then, test voltages are applied to input leads 82 and 83 to obtain a reading on the unit 65 at TP9 of $-10.00$. Next, with the switch 75 in its depicted position and the test voltages still applied to the leads 82 and 83, the value of the variable-resistance element 50 is varied to achieve on the unit 65 a reading whose value is 0.5 times the value that was calculated for $k_1$ for a particular subregion to be measured. (The full-scale reading of the unit 65 is $\pm 20.00$, whereas $k_1$ is calculated based on a full-scale value of $T$ of 1.00. Thus, the correct setting of the variable resistor 50 is achieved when the reading on the unit 65 is $-10.00$ times $-k_1/20.00$, or $0.5k_1$.). The adjustment of the variable resistor 51 to correspond to $k_2$ can then be accomplished by applying test voltages to the inputs 82 and 83 to obtain a reading on the unit 65 at TP9 of 0.00. Finally, with the switch 75 set to monitor TP11, the variable resistor 51 is adjusted until the value $k_1$ is read directly on the unit 65.

With the elements 50 and 51 of FIG. 4 so established at settings representative of a particular subregion geometry, the specific illustrative arrangement shown in FIGS. 3 and 4 is ready to make a linewidth measurement on an actual mask containing such subregions. First, the mask 20 is positioned to place an all-clear subregion in the field of view of the microscope 10. In response thereto, the photodetectors 34 and 44 provide electrical signals that are respectively applied to the input leads 82 and 83 of the FIG. 4 circuitry. After a polarity inversion of the reference input signal derived from the photodetector 34, this signal is divided by the input signal provided by the photodetector 44, thereby to supply a so-called normalized input signal at the output of the divider unit 62.

Depression of the switch 66 (FIG. 4) causes a voltage proportional to the normalized input signal to be applied to the capacitor 68. This voltage, which is representative of an all-clear mask subregion, remains on the capacitor 68 for a relatively long time (for example several minutes) because of the high-input-impedance characteristic of the amplifier 53. Thus, the signal appearing at the output of the amplifier 53 is a normalized version of the signal derived from the actual measured amount of light transmitted through an all-clear subregion. The value of this signal is designated C in expression (3) above.

The mask 20 of FIG. 3 is then moved to place an all-opaque subregion of the mask in the field of view of the microscope 10. Depression of the switch 67 of FIG. 4 then causes a persistent voltage representative of an all-dark subregion to be established on the capacitor 69. Thus, the signal appearing at the output of the amplifier 54 corresponds to the quantity designated B in expression (3).

The noted B signal shown in FIG. 4 is applied via the amplifier 55 to the amplifier 56 wherein it is combined with the aforementioned C signal. After propagating through the amplifiers 56 and 58, the combined signal (designated C-B) is applied to the upper input of the divider unit 63.

After the aforedescribed calibration interval, which typically takes only several seconds to perform, the mask 20 of FIG. 3 is moved to place the particular subregion of interest in the field of view of the microscope. As a result thereof a normalized signal whose value is designated S in expression (3) above, is applied to the amplifier 57 of FIG. 4 for combination with the $-B$ signal. In turn, the output of the amplifier 57

(which is a signal designated $-S+B$) is also applied to the divider unit 63. The output of the unit 63 is designated $(-S+B/C-B)$.

The output of the divider unit 63 of FIG. 4 is subsequently inverted and combined with the constants $k_1$ and $k_2$ by the indicated circuitry. As a result, the output of the amplifier 60 at TP11 is represented by the expression $$k_1(S-B/C-B) + k_2 \qquad (5)$$

which is identical to expression (1) if the value of $T$ defined by expression (3) is substituted for $T$ in expression (1). Accordingly, the signal applied to the display unit 65 is representative of the width $w_x$ of a prespecified line in a particular mask subregion.

As mentioned above, the signals designated C and B are respectively retained on the capacitors 68 and 69 for a relatively long period of time. Accordingly, linewidth measurements in multiple supposedly identical subregions of a mask can be made simply by repeatedly repositioning the mask to place corresponding subregions of the mask in the field of view of the microscope 10. Successive linewidth measurements can thereby be made rapidly across the entire face of the mask. Each linewidth reading is displayed automatically immediately after the mask is repositioned and the crank 40 moved to its detecting position.

The principles of the present invention are also directly applicable to measuring wafer linewidth. In that case, light is directed at and reflected from surface subregions of the wafer. An adequate contrast in the reflecting characteristics of wafer features can be achieved in a variety of ways. For example, in some instances a patterned resist on the surface of the wafer may be dyed to decrease its reflectively relative to surface portions of the wafer that are not covered with resist. Alternatively, the resist may be left in its normal condition to serve as a reflective pattern relative to an oxide layer on the wafer. By varying the thickness of such an oxide layer, the contrast ratio between the resist and oxide can be optimized. Or in some cases it may be advantageous to transfer the pattern in the resist to the oxide layer itself by selective etching thereby to enhance the contrast between features on the wafer surface.

Thus, there have been described herein a technique and an apparatus for rapidly and nonsubjectively measuring linewidths on masks and wafers. In particular, the herein-considered technique is ideally suited for making measurements on LSI masks and wafers in an installation in which contact or nearcontact printing is utilized to fabricate wafers that contain multiple step-and-repeated features. When properly calibrated as specified above, the herein-considered technique rivals the accuracy of any of the standard alternative methods that are available for making such measurements.

Finally, it is to be understood that the above-described procedures and arrangements are only illustrativeof the application of the principles of the present invention. In accordance with those principles, numerous other techniques and apparatus may be devised by those skilled in the art without departing from the spirit and scope of the invention.

What is claimed is:

1. A method for measuring linewidths in selected subregions of a microminiature element, such subregion including features exhibiting two contrasting optical properties, said element also including at least two reference subregions each exhibiting uniformly a different one of said two optical properties, said method comprising the steps of directing light from a source at each of said reference subregions, generating normalized reference signals derived from light obtained directly from said source and from light that impinged upon said reference subregions, directing light from said source at a selected subregion, generating a normalized subregion signal derived from light obtained directly from said source and from light that impinged upon said selected subregion, processing said normalized reference signals and said normalized subregion signal to generate a signal representative of one of said optical properties of said selected subregion, and processing said last-mentioned signal in accordance with a predetermined relationship to generate a signal representative of a specific linewidth in said selected subregion.

2. A method as in claim 1 wherein light from said source is directed at reference and selected subregions of a mask member for transmission therethrough, wherein said first-mentioned processing step comprises generating a signal in accordance with the expression $$T = -0\ (S-B/C-B)$$

where $S$ is the value of the normalized subregion signal derived from the actual measured amount of light transmitted through a selected subregion, $B$ is the value of the normalized reference signal derived from the actual measured amount of light transmitted through an all-opaque reference subregion and $C$ is the value of the normalized reference signal derived from the actual measured amount of light transmitted through an all-clear reference subregion, and wherein said second-mentioned processing step comprises generating a signal in accordance with the expression $$w_x = k_1 T + k_2$$

where $T$ is defined above and $k_1$ and $k_2$ are predetermined constants calculated for each different subregion configuration.

3. A method of determining mask linewidth for any particular feature among a variety of features in a repeated LSI mask array by measuring the average light transmission of any specified subregion of the mask that includes said feature, said method comprising the steps of measuring the normalized light transmission $S$ of a specified subregion of said mask, measuring the normalized light transmission $B$ of a nominally opaque subregion of said mask, measuring the normalized light transmission $C$ of a nominally transparent subregion of said mask, calculating the actual light transmission $T$ of said specified subregion in accordance with the relationship $T = (S-B/C-B)$ and in an analog computing circuit automatically converting said value of $T$ to an actual determination of linewidth in accordance with the relationship $w = k_1 T + k_2$, where $w$ is the linewidth and $k_1$ and $k_2$ are predetermined constants respectively associated with a particular feature in each different specified subregion.

4. Apparatus for measuring linewidths in selected subregions of a microminiature element, each subregion including features exhibiting two contrasting optical properties, said element also including at least two reference subregions each exhibiting uniformly a different one of said two optical properties, said apparatus comprising means including a source for directing light at each of said reference subregions and at a selected subregion to be measured, means responsive to light obtained directly from said source and from light that impinged upon said reference and selected subregions for generating normalized reference and subregions signals, means for processing said normalized signals to generate a signal representative of one of said optical properties of said selected subregion, and means for processing said last-mentioned signal in accordance with a predetermined relationship to generate a signal directly representative of a specified linewidth in said selected subregion.

5. Apparatus as in claim 4 wherein said directing means is arranged to direct light from said source at reference and selected subregions of a mask member for transmission therethrough, wherein said first-mentioned processing means comprises means for generating a signal in accordance with the expression $$T = (S - B/C - B)$$

where $S$ is the value of the normalized subregion signal derived from the actual measured amount of light transmitted through a selected subregion, $B$ is the value of the normalized reference signal derived from the actual measured amount of light transmitted through an all-opaque reference subregion and $C$ is the value of the normalized reference signal derived from the actual measured amount of light transmitted through an all-clear reference subregion, and wherein said second-mentioned processing means comprises means for generating a signal in accordance with the expression $$w_x = k_1 T + k_2$$

where $T$ is defined above and $k_1$ and $k_2$ are predetermined constants calculated for each different subregion configuration.

6. Apparatus for determining mask linewith for any particular feature among a variety of features in a repeated LSI mask array by measuring the average light transmission of any specified subregion of the mask that includes said feature, said apparatus comprising means for measuring the normalized light transmission S of a specified subregion of said mask, means for measuring the normalized light transmission $B$ of a nominally opaque subregion of said mask, means for measuring the normalized light transmission $C$ of a nominally transparent subregion of said mask, means for calculating the actual light transmission $T$ of said specified subregion in accordance with the relationship $T = (S - B/C - B)$.

and means for automatically converting said value of $T$ to an actual determination of linewidth in accordance with the relationship $w_x = k_1 T + k_2$, where $w_x$ is the linewidth and $k_1$ and $k_2$ are predetermined constants respectively associated with a particular feature in each different specified subregion.

* * * * *